United States Patent [19]

Heard et al.

[11] 4,167,741

[45] Sep. 11, 1979

[54] RASTER SLANT CONTROL IN AN INK JET PRINTER

[75] Inventors: Roderick S. Heard; David W. Phillips, both of Lexington, Ky.

[73] Assignee: International Business Machines Corporation, Armonk, N.Y.

[21] Appl. No.: 864,068

[22] Filed: Dec. 23, 1977

[51] Int. Cl.[2] .......... G01D 15/18

[52] U.S. Cl. .......... 346/75

[58] Field of Search .......... 346/75, 1; 400/126

[56] References Cited

U.S. PATENT DOCUMENTS

| | | | |
|---|---|---|---|
| 3,895,386 | 7/1975 | Keur | 346/75 X |
| 3,938,163 | 2/1976 | Fujimoto | 346/75 |
| 4,122,458 | 10/1978 | Paronjpe | 346/75 |

*Primary Examiner*—Joseph W. Hartary

*Attorney, Agent, or Firm*—William J. Dick

[57] ABSTRACT

An ink jet printer in which the nozzle for emitting a stream of ink drops, the charge electrode for charging ink drops in accordance with signals to be recorded, and the deflection electrodes for providing an electric field therebetween to deflect ink drops in accordance with the magnitude of the charges on the drops, are mounted on a carrier which moves relative to an ink drop record receiving media for forming images indicative of the signals on the deflected ink drops. To compensate for the inclination of the image formed by the carrier movement relative to the recording media, a voltage gradient or difference is applied across at least one of the deflection electrodes so as to effect electric field distortion intermediate the electrodes to thereby compensate for the slant due to carrier velocity.

14 Claims, 7 Drawing Figures

RASTER SLANT CONTROL IN AN INK JET PRINTER

SUMMARY OF THE INVENTION AND STATE OF THE PRIOR ART

The present invention relates to ink jet printers of the charge amplitude controlling type, and more particularly relates to a method of an apparatus for controlling the inclination of images (patterns, characters, etc.) formed by the ink drops in that kind of printer.

The IBM 6640 Document Printer employs a single nozzle ink jet printer of the charge amplitude control type. In that type of printer, deflection of a charged ink drop in the vertical direction of the dot pattern is accomplished by controlling the charge amplitude on individual ink drops so as to produce differences in the amount of deflection between the ink drops as they pass between a pair of deflection electrodes. Deflection in the horizontal direction, however, is produced by the movement of the carrier, the carrier having mounted thereon the nozzle for emitting the stream of ink drops, a charging electrode for charging the ink drops in accordance with the signals to be recorded, and the deflection electrodes.

In the IBM 6640 document printer, the ink drops are scanned in a vertical direction, in that instance from their lowest to their highest printing position. When a white space is to be left without an ink drop thereon, the ink drops are uncharged or receive a minimal charge and are propelled towards a gutter for recirculation back to the ink supply system. As the raster in the ink jet printing machine progresses from its lowest to highest deflected printing position, the carrier moves from left to right so that the raster slants in the direction of carrier motion. In the 6640 Document Printer, the effect in nominally 0.00417 inches (0.106 mm) on a vertical distance of 0.167 inches (4.24 mm), or 1.43 degrees. In the aforementioned IBM printer, the slant is eliminated by tilting the deflection plate assembly by the same angle in the opposite direction.

If it is desired to print on the right to left carrier motion, utilizing the tilting of the deflection plate assembly mode, the slant will reappear at double the magnitude, as the plates are tilted in the wrong direction. A solution proposed by Leon M. Cooper and Walter J. Wipke for a mechanism which reverses the plate assembly tilt during reverse carrier motion is an acceptable and viable one.

Other approaches may rely on the fact that the charge on a drop is roughly proportional to its height in the raster. Therefore, introduction of a second set of deflection plates with a horizontally disposed electric field between the charge electrode and the main deflection plates may be employed to provide raster tilt. Such a system is described in U.S. Pat. No. 3,938,163. Compared to the main deflector, the needed deflection in the horizontal direction is only about 2.5%, the length of the throw from the mid-point of the deflector being about twice as far from the page, and the deflector plates can be much closer together since deflection within them is quite small. For example, at a 0.030 inch (0.762 mm) spacing, a 0.0100 inch (0.254 mm) length, and a 125 volt supply may be sufficient for a system such as the IBM 6640 Document Printer, thus making it feasible to electronically switch horizontal deflection voltage during carrier turnaround. However, even 0.254 mm added to the length of throw (throw is defined as the distance that the drop must travel from the nozzle to the paper) increases the already difficult ink drop merge and scatter problem.

A raster tilt effect may be observed when the stream is not centered in the charge electrode. A way to electronically simulate this is to provide a charge electrode split into right and left halves, with the half toward which the stream is to be deflected being driven at a greater voltage. In the extreme case, only the side towards which the stream is to be deflected could receive voltage. However, in any case, right and left halves of such a split electrode should be driven such that the drop receives the same net charge as with a single charge electrode. This method has the advantage of not adding significantly to the length of throw, but has the effect of being sensitive to variations in stream break off distance.

The present invention relates to a method and apparatus for controlling the inclination of images formed by ink droplets in an ink jet printer by electrically distorting the electric field formed intermediate the deflection electrodes of the ink jet printer.

In view of the above, it is a principle object to the present invention to control the inclination of patterns, images, characters and the like performed by ink jet printers by distorting the electric field between the deflection electrodes.

Another object of the present invention is to control the amount of distortion of the electric field intermediate the deflection electrodes in an ink jet printer to effect the following advantages:

a. To permit changes in printing speed while compensating for tilt of the pattern or image;

b. To permit highlighting or italicizing (i.e. deliberately tilting the characters, or images to highlight the pattern thus made);

c. To effect ease in bi-directional printing by distortion of the electric field in one or the other directions depending upon the direction of movement of the carrier.

d. Simplicity in modifying existing machinery to make the machinery more versatile.

Yet another object of the present invention is to control the inclination of the ink drop stream in an ink jet printer by electric field distortion while reducing contamination.

Other objects and a more complete understanding of the invention may be had by referring to the following specification and claims taken in conjunction with the accompanying drawings in which:

Figure 1:
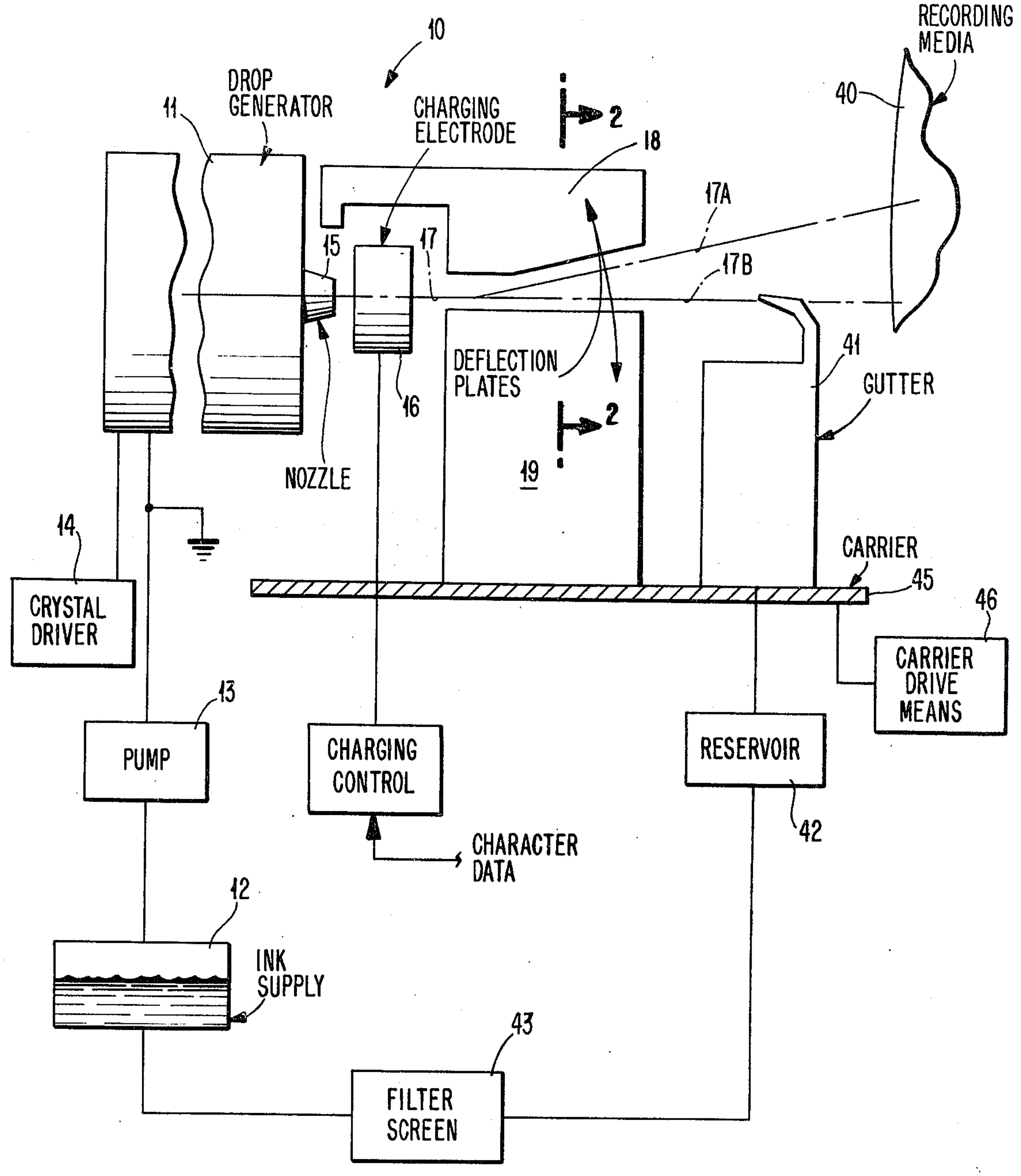
FIG. 1 is a fragmentary schematic view in side elevation illustrating a typical ink jet printer of the charge amplitude type.

Referring now to the drawing and especially FIG. 1 thereof, apparatus constructed in accordance with the present invention is illustrated therein. In the illustrated instance, the apparatus comprises an ink jet printer 10 of the charge amplitude control type comprising a drop generator 11 to which is supplied, as from an ink supply 12 pressurized ink as by a pump 13. The drop generator is vibrated in a conventional manner as by a piezoelectric crystal by a crystal driver 14 such that as ink is dispelled from a nozzle in a stream, stream break up occurs within a predetermined distance from the nozzle in a charging electrode 16. The ink drops are charged by the charging electrode 16 in accordance with signals representative of character data from a charging control and character data line. The ink droplet stream 17 then passes intermediate first and second deflection electrodes 18 and 19 respectively, between which electrodes is provided an electric field so that the droplets are deflected, for example, along path 17A. The deflected height of the droplets is of course dependent upon the amplitude of the charges on the drops. The droplets impinge upon a record receiving means 40 for forming patterns such as images, characters, etc. indicative of the signals on the deflected ink drops. Typically, blank spaces in the amplitude control type ink jet printer are afforded by placing a low charge or no charge on the drops as they are formed within the charging electrode 16, these droplets passing between the deflection plates 18 and 19 along path 17B where they impinge upon a gutter 41 which allows ink to be recirculated first into a reservoir 42, through a filter screen 43 and then into the ink supply chamber 12.

The nozzle 15 (usually included in the drop generator 11) as well as the charging electrode 16, deflection electrodes 18 and 19 and gutter 41 are mounted on a carrier 45 which is driven as by carrier drive means 46 to effect horizontal movement of the ink drop stream relative to the record receiving means 40, in the instance of FIG. 1 the carrier moves into and out of the plane of the paper.

Figure 3A:
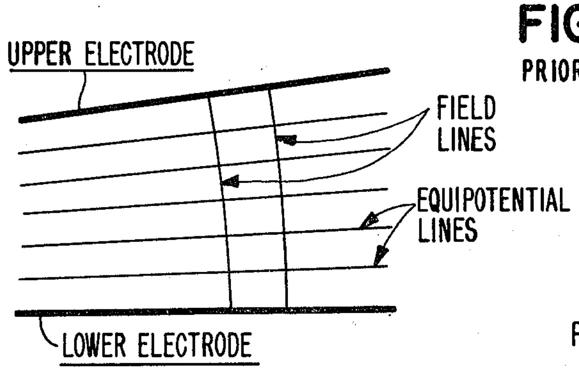
FIG. 3A PRIOR ART
FIG. 3A is a schematic diagrammatic view of a typical plate positioning, electric field lines and equal potential lines of a prior art deflection electrode system.

Assuming that the carrier 45 is moving from within the paper towards the reader (looking at the record receiving means 40, from left to right) and assuming that the drop scan is from bottom to top, i.e. from line 17B, upward through 17A, the upper drops, being the last to be formed and received by the record receiving means 40, will be moved to the right on the paper or record receiving means and will give the pattern, image or characters a slope to the right. In order to compensate for the inclination or tilt caused by carrier movement, it is a typical practice to tilt the deflection electrode assembly, or least one of the electrodes, for example, the upper electrode, to effect tilting of the electric field lines intermediate the deflection electrodes. FIG. 3A illustrates such a condition wherein the upper electrode is skewed with respect to the lower electrode so as to skew the field lines from right to left (bottom to top) to thereby compensate for the tilt of the ink drops due to carrier motion in the left to right ink drop printing mode. As set forth in the portion of the specification labelled "Summary of the Invention and State of the Prior Art", in the IBM 6640 Document Printer, the tilt is or skew of the electrode assembly is approximately 1.43 degrees, the plates or electrodes being fixed at that position so that printing may occur from left to right without character tilt. However, it should be recognized that such tilt of the deflection electrode assembly is only good for one velocity of the carrier, it being necessary to effect an increase or decrease in the tilt of the electrode assembly if the speed of the carriers or the carrier motion is increased or decreased respectively. Moreover, if printing is to be accomplished bi-directionally, the assembly must be tilted in the opposite direction.

In accordance with the invention, means are provided for controllably electrically distorting the electric field between the deflection electrodes to not only compensate for the tilt of the character or images formed, but to create, when desired, such tilt, for example for highlighting or the like, as well as to permit the printer to run at various speeds without tilt. To this end, and referring now to FIG. 2, the preferred means of distorting the electric field intermediate the deflection electrodes to effect a tilt to images being formed by the stream of ink droplets is illustrated therein whereby applying a potential difference across or a voltage gradient across at least one of the electrodes to effect a change in potential between the electrodes to thereby distort the electric field between the electrodes, is illustrated therein. As shown, the upper electrode 18 may comprise a plate divided longitudinally into at least two segments, in the illustrated instance multiple segments having conductive portions 21 spaced from each other as by insulator portions 22, the plate in the illustrated instance including unsegmented terminal end portions 18A and 18B inasmuch as the individual ink droplets in the stream 17 are positioned centrally with regard to the horizontal extent of the plates, only the central portion of the electrode 18 need be segmented. The lower electrode or plate 19 is connected to a conventional high voltage power supply 23 which normally provides a negative voltage to the lower plate. In conventional practice, the upper electrode, if unsegmented, would normally be at ground potential, but in the illustrated instance, the upper electrode or plate 18 is powered separately as by a horizontal tilt supply 25 which applies current through a resistive voltage divider network or load 26 which includes a plurality of resistors, in the illustrated instance, the resistors $R_O$ being of the same value. As shown, the resistors are connected in series and each resistor is connected also across a respective conductive plate and insulator to the succeeding segmented conductive portion 21 so that with the power supply 25 shown in the position illustrated in FIG. 1, (including the switch 25A) the positive voltage is applied to the left hand or first conductive plate 18B, while the right hand terminal 18A is at ground potential. In this manner, the field lines are distorted as illustrated intermediate the plates or electrodes 18 and 19. The position of the switch 25A is for a carrier motion of left to right such as illustrated by the arrow.

Typical conditions for correcting the tilt of characters produced on an ink jet printer are with a high voltage supply of minus 3300 volts, a horizontal tilt supply of +180 volts a carrier speed of 7½ inches per second (19 cm/sec.) and a drop generator frequency rate of 117,000 cycles (drops) per second. The resistors $R_O$ may be of any value such as 300 Kohms to provide the necessary voltage gradient and drop from 180 volts to ground potential. Obviously, when the carrier moves in a direction opposite to that illustrated by the arrow 27, simply switching the voltage supply to make the right hand resistor or plate portion 18A at 180 volts and 18B at ground potential will effect electric field distortion in the opposite direction from that shown, thereby correcting the tilt of the character being formed when the carrier is printing in the opposite direction.

Figure 3B:
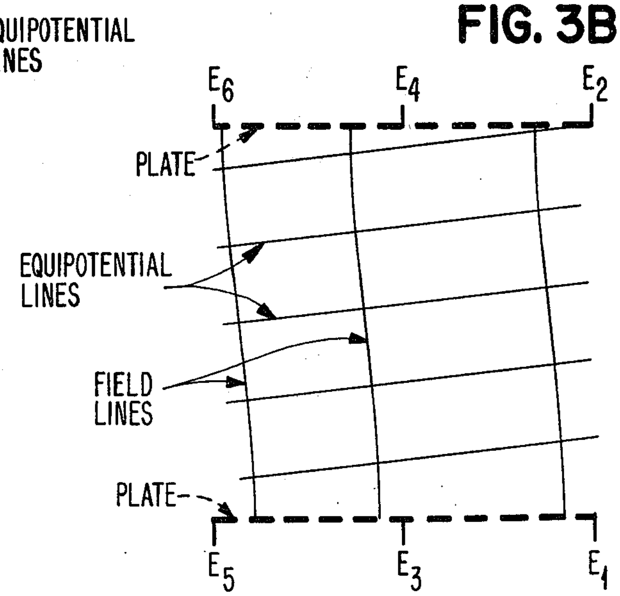
FIG. 3B is a view similar to FIG. 3A except illustrating an alternate embodiment of the present invention in which the field lines are distorted due to voltage gradients or differences in potential being applied across both of the deflection electrodes to distort the electric field intermediate the electrodes.

Another embodiment is schematically depicted in FIG. 3B wherein both the top and bottom deflection electrodes are segmented to provide a differential voltage across both of the electrodes to effect a distortion in the electric field between the electrodes. In FIG. 3B, only a portion of each of the plates or electrodes is illustrated, for example, at E1 the lower plate segment may be biased at minus 3.3 Kv and the upper plate segment E2 biased at ground potential; segment E3 would be biased at a minus 3.225 Kv while segment E4 would be biased at plus 45 volts; segment E5 would be biased at minus 3.21 Kv while upper plate segment E6 is biased at plus 90 volts. In this way, the field lines would be sloped as illustrated, and the equal potential lines would be substantially as shown. In the case shown in FIG. 3B, the carrier motion is once again from left to right which would require a reversal of the voltages set forth above if it is desired to print in the opposite direction.

Figure 2:
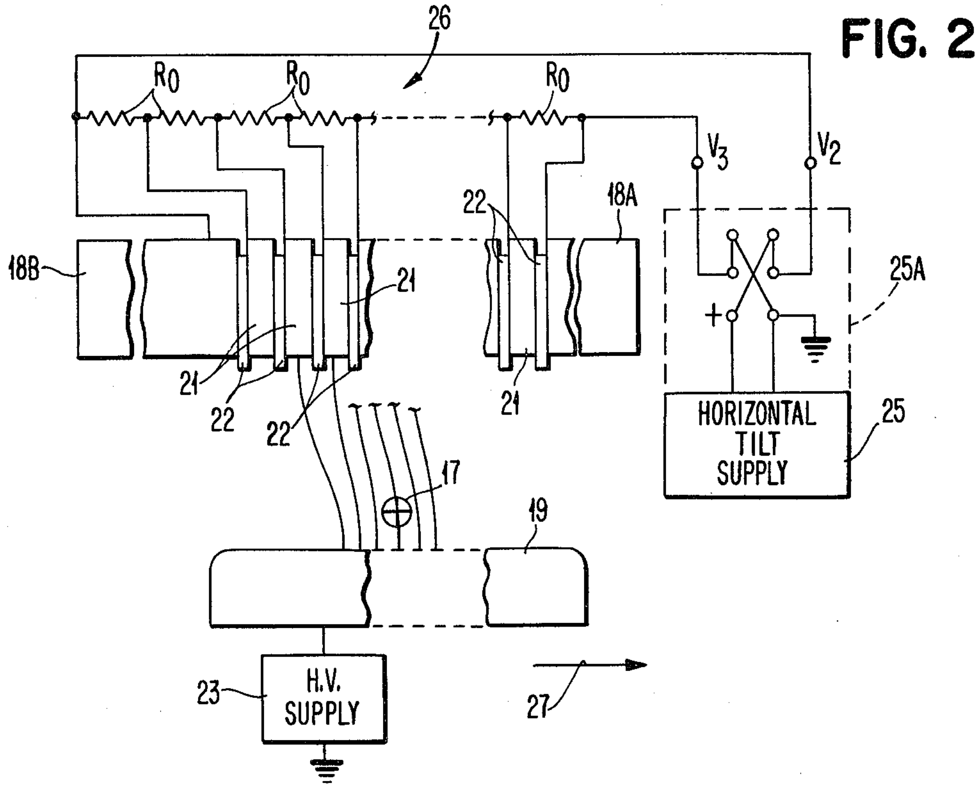
FIG. 2 is an enlarged fragmentary end view taken along line 2—2 of FIG. 1 and illustrating one embodiment constructed in accordance with the present invention.
Figure 4:
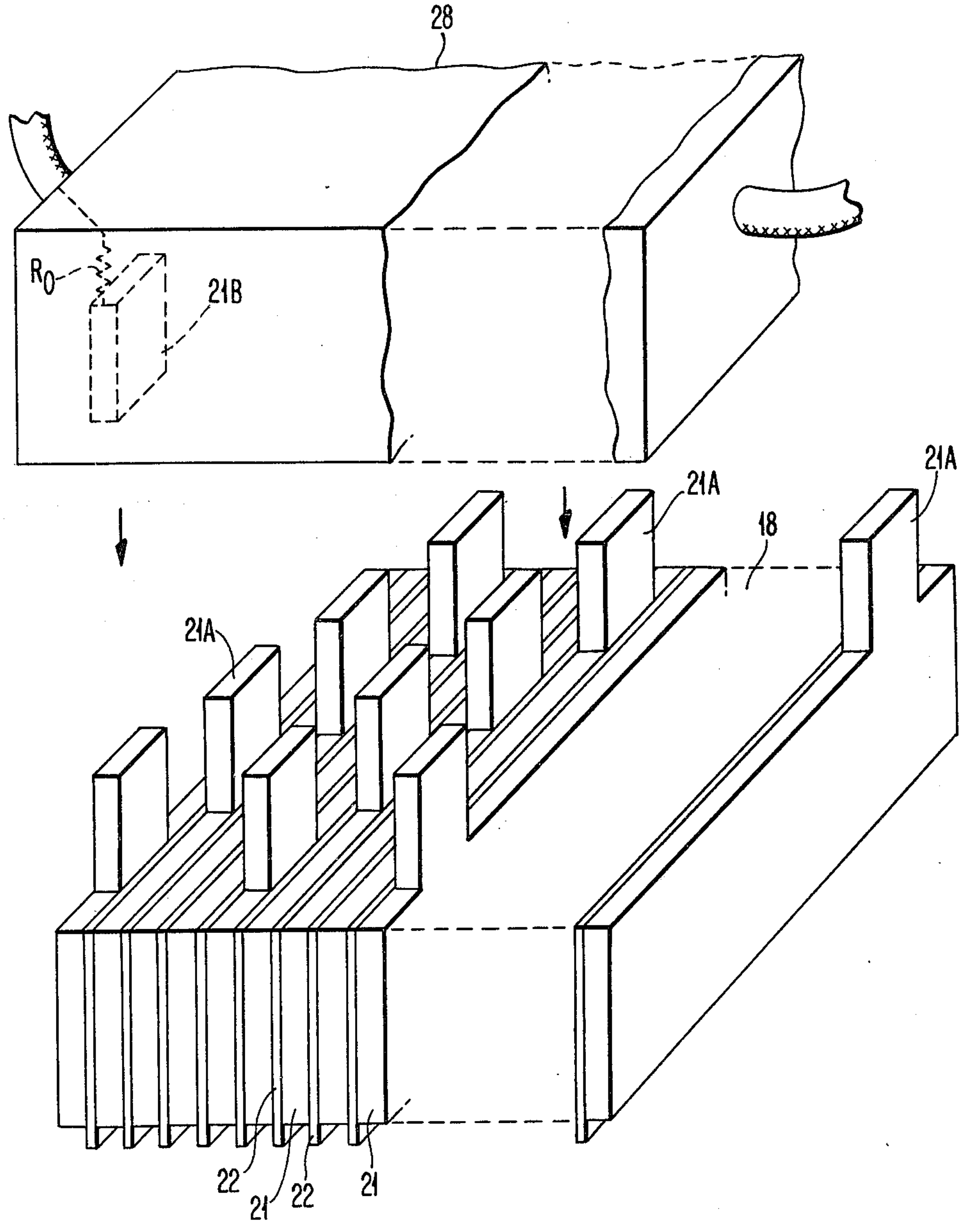
FIG. 4 is an enlarged schematic perspective view of a means for physically mounting one of the electrodes, such as illustrated in FIG. 2, so as to achieve the necessary voltage gradient across the plates.

In most instances it is only necessary to provide a potential difference or a voltage gradient across one of the plates, and of course it is simpler to provide such a gradient and the ability to switch the gradient, depending upon the direction of printing, by switching a lower voltage supply. Accordingly, the embodiment illustrated in FIG. 2 is to be preferred. Moreover, as illustrated in FIG. 4, the upper plate or electrode may be more easily manufactured by providing the conductor segments 21 with tabs such as the tabs 21A which project upwardly and fit into contact sockets or the like 21B in an encapsulated resistor module 28. In this manner the module may be plugged into the electrode 18.

Additionally, while the insulators 22 intermediate each of the conductive segments 21 may be kept flush with the lower surface of the electrode, by permitting the insulators 22 to project or depend from the electrode 18, any contamination build up from ink mist or fogging will collect on the insulators as opposed to the conductive plates, thereby minimizing the frequency of cleaning of the plates that may be required in an operating machine.

While there are numerous ways in which a voltage gradient may be provided to extend across the electrode, for example, a thick or thin film resistor covering the entire lower portion of the electrode, a portion thereof or even composing the electrode of a resistive material to achieve the desired voltage drop across the electrode, the segmented conductive plate approach such as heretofore described is the preferred embodiment. Moreover, almost any power supply and switch may be employed when a single voltage gradient electrode system such as illustrated in FIG. 2 is utilized will suffice inasmuch as the voltage being switched is low as compared to the high voltage supply which, under conventional circumstances may run very high (in the example given about 3.3 Kv).

Figure 5A:
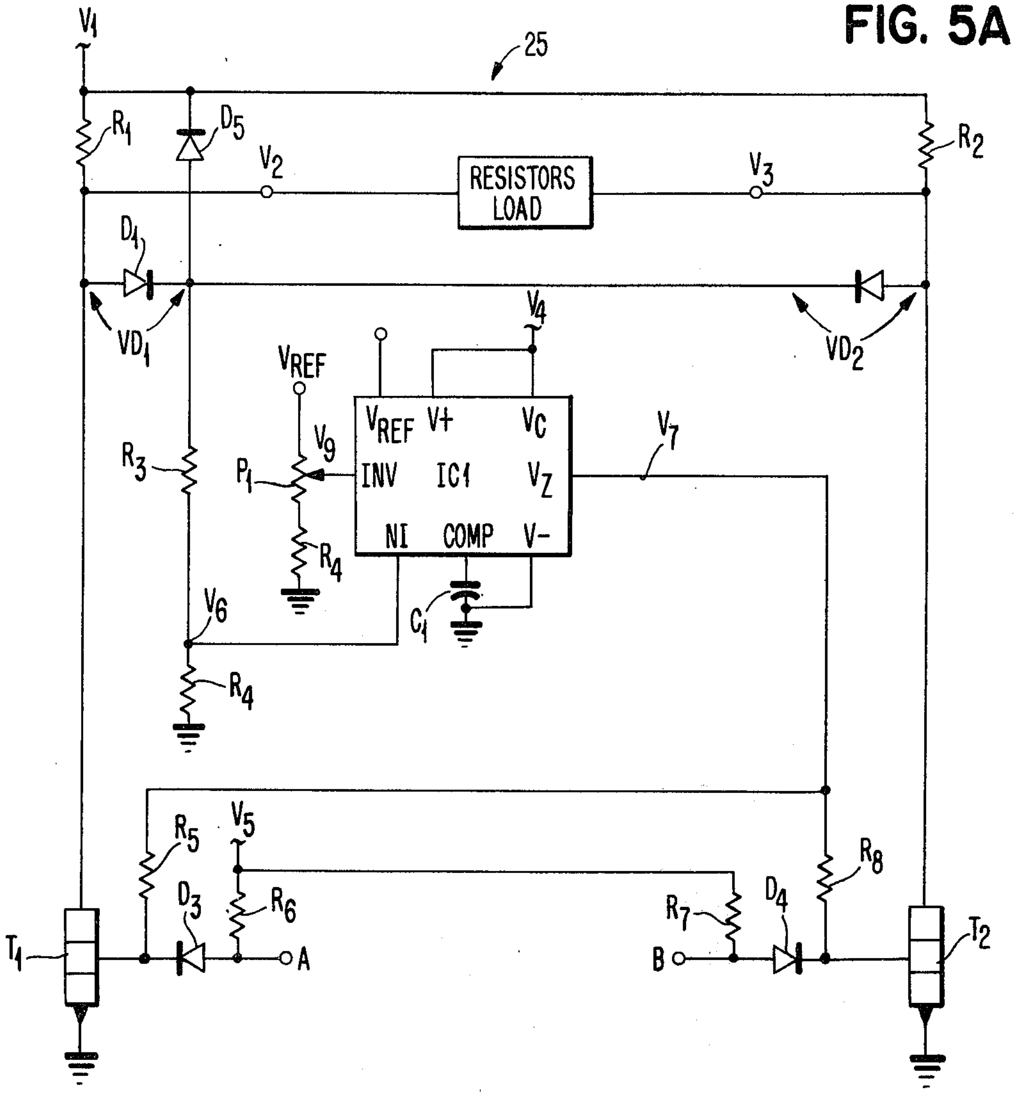
FIG. 5A is a schematic diagram of a horizontal tilt supply to achieve the necessary voltage gradient across at least one of the plates of the deflection electrodes illustrated in FIGS. 1 and 2.

A preferred horizontal tilt supply 25 is illustrated in FIG. 5A. While the supply shown is applicable particularly to the embodiment shown in FIG. 2, it should be recognized that with parts modification it is also applicable (by providing two such supplies) for both the upper and lower electrodes for use in the embodiment shown in FIG. 3B. Referring now to FIG. 5A, the inputs A and B are the inverse of each other so that the B input to the base of transistor T2 can be considered $\overline{A}$. The inputs to A and B may be derived from any source, for example, the conventional switches employed in the IBM 6640 Document Printer which indicates that the carrier is at the right or left hand side of its travel, or the carrier position indicating grating such as illustrated in U.S. Pat. Nos. 3,834,505, 3,831,728, or 4,050,564 including areas on the grating which indicate the limits of carrier travel. Turning now to FIG. 5a, assuming that the input to A is up and B is down, then transistor T1 is saturated and the power supply (VI) will provide current through R1 to ground through T1. This means that the voltage at point V2 is essentially at ground also. Current therefore flows from V1 through R2 to V3, and through R2 through diode D2, and resistor divider R3 and R4. A voltage V6 from intermediate resistors R3 and R4 is applied to the non-inverting input of a voltage regulator IC1. Voltage V9 which is applied from a reference voltage which may be internal to the regulator or may be an external reference voltage, is applied through a potentiometer P1 to the inverting input of IC1. If the reference voltage is from an external voltage, then the load voltage across resistor load 26 will track the voltage applied to V ref. In the following manner, voltage V3 will be held at a level necessary to maintain voltage V6 equal to voltage V9: Suppose that voltage V3 starts to increase in voltage. This will cause voltage V6 to increase and in turn the output, voltage V7 of IC1 will increase. An incease in voltage V7 causes more current to flow through resistor R8 and into the base of transistor T2. Transistor T2 will then conduct more heavily causing more voltage to be dropped across resistor R2, thus decreasing voltage V3 until voltage V6 equals voltage V9. In the event that the voltage at V3 starts to decrease causing voltage V6 to fall below voltage V9, voltage V7 will decrease, lowering the base drive to transistor T2. This will cause T2 to conduct less heavily causing less voltage drop across resistor R2 and thus increasing the voltage at V3 until voltage V6 again equals voltage V9. As may be seen, in the above manner, the voltage at V3 will be maintained at a level equal to $(R3+R4)/R4(V6+VD2)$, where voltage V6 equals voltage V9. Conversely, if B goes up and A down, transistor T2 will tend to saturate and current will flow from voltage V1 through resistor R1 to V2, and through diode D1 and then through the resistor divider R3 and R4, developing voltage V6. The voltage at V2 is regulated in the same manner as the voltage at V3 as set forth above except that the voltage at V7 now drives transistor T1, thus controlling the current through resistor R1 by an amount necessary to maintain voltage $V2=(R3+R4)/R4(V6+VD1)$, where voltage V6 is equal to voltage V9.

In any instances where it is desired, for example, to allow for a tilt or highlighting, both A and B may be up permitting both of transistors T1 and T2 to be saturated and allowing the voltages at V2 and V3 to be essentially at ground or zero volts. Moreover, by adjusting potentiometer P1, the voltage range across the load may be varied so that the degree of tilt or inclination may be modified as desired.

While most of the resistors and diodes have, on their face, an intended use which is obvious to one skilled in the art, diode D5 is a high voltage arc protection diode for the circuit. If a high voltage arc to the load occurs, the energy is shunted to the V1 voltage supply through either of the diodes D1, D2 to D5.

Figure 5B:
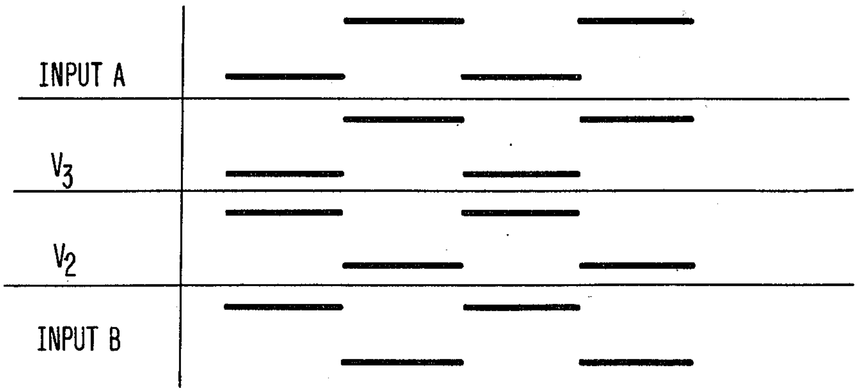
FIG. 5B is a voltage wave form diagram of various points on the schematic diagram of FIG. 5A.

In the diagram of FIG. 5B, the various inputs conditions and output or voltage conditions across the load are illustrated. For example, when the input A is down and B up, the voltage at V3 is down while the voltage at V2 is up; when the input to A is up and B down, the voltage at V3 is up and the voltage at V2 is down.

The following is a listing of component values and suitable voltages which may be applied to operate the horizontal tilt supply 25 as previously described under the operating conditions of the example given relative to FIG. 2.

V1=270±10% volts
V2 and V3=160 to 200 volts (with respect to ground)
V4=12 volts
V5=5 volts
R1, R2=100K, 2 watts
R3=1.3 meg.
R4=43K
R5, R8=51K
R6, R7=10K
R9=18K
P1=10K Potentiometer
C1=0.47 uf
D1, D2=1N5395
D3, D4=1N482
D5=1N5395
T1 and T2=2N3439
IC1=723 voltage regulator Accordingly, the present invention provides a method and apparatus which is simple in nature but may be employed to control the inclination of patterns or images in an ink jet printer, and which permits the tailoring of inclination for either correcting for the natural tilt due to carrier motion in the conventional ink jet printer or may be controlled to effect such tilt for highlighting and the like. Moreover, regardless of the direction of scan of the ink drop stream (i.e. bottom to top or vice-versa), the direction of motion of the carrier or even the record receiving media, the distortion in the electric field may be controlled.

Although the invention has been described with a certain degree of particularity, it is understood that the present disclosure has been made only by way of example and that numerous changes in the details of construction, the combination of arrangement of parts, and the method of operation may be made without departing from the spirit and scope of the invention as hereinafter claimed:

What is claimed is:

1. An ink jet printer comprising in combination:
a nozzle for emitting a stream of ink drops; a charging electrode for charging said ink drops in accordance with signals to be recorded; first and second spaced apart deflection electrodes respectively on opposite sides of said stream of ink drops, voltage supply means connected to said deflection electrodes to effect an electric field intermediate said deflection electrodes to deflect ink drops in accordance with the magnitude of the charges on said drops; record receiving means for forming images indicative of the signals on said drops deflected by said deflection electrodes; carrier means mounting said nozzle and deflection electrodes and means for effecting relative movement between said record receiving means and said carrier means; and electrical means for producing a voltage difference across at least one of said deflection electrodes for distorting the electric field between said deflection electrodes to thereby control the tilt of an image formed on said record receiving means by said ink drops.

2. An ink jet printer in accordance with claim 1 including means for adjusting the voltage difference across said deflection electrode.

3. An ink jet printer in accordance with claim 1 including means for reversing the voltage difference across said at least one deflection electrode.

4. An ink jet printer in accordance with claim 1 wherein one of said deflection electrodes is divided longitudinally into a plurality of separate conductive segments, said electrical means comprising a second voltage supply means connected to said segments, and means to effect a voltage difference between said segments and therefore across said one deflection electrode.

5. An ink jet printer in accordance with claim 4 including at least one insulator between said segments.

6. An ink jet printer in accordance with claim 5 wherein said insulator depends below the lower surface of said segments.

7. An ink jet printer in accordance with claim 4 wherein said one of said deflection electrodes includes terminal end portions with said segments therebetween.

8. An ink jet printer in accordance with claim 1 wherein said electrical means produces a voltage difference across the first electrode, and means in said voltage supply means connected to the other of said electrodes to produce a voltage difference across said other of said electrodes.

9. An ink jet printer in accordance with claim 4 wherein at least one of said deflection electrodes is divided longitudinally into a plurality of separate conductive elements, said electrical means including means connected to each of said segments for providing a voltage difference between each of said segments.

10. A method of controlling pattern inclination or tilt in an ink jet printer of the charge amplitude control type wherein a stream of ink droplets in an image forming scan is in a first direction and the movement of the elements forming, charging and deflecting the droplets is in a second direction substantially orthagonal to the first direction, said elements effecting deflection of the droplets comprising a pair of spaced apart deflection electrodes between which ink droplets pass, said electrodes having a potential difference therebetween to form an electric field therebetween, comprising the steps of: forming the stream of ink droplets, charging selective ink droplets in accordance with signals to be recorded; deflecting said selected droplets in accordance with the magnitude of the charges on said drops; and electrically distorting the electric field intermediate said deflection electrodes by applying a potential difference across at least one of said deflection electrodes to effect a change in potential between said deflection electrodes to thereby control the tilt of patterns being formed by said stream of ink droplets.

11. A method of controlling pattern inclination in an ink jet printer in accordance with claim 10 including the step of distorting the electric field in an opposite direction.

12. A method of controlling pattern inclination in an ink jet printer in accordance with claim 10 including the step of switching the change in potential across said one deflection electrode to effect a change in the electric field distortion in the opposite direction.

13. A method of controlling pattern inclination in an ink jet printer in accordance with claim 10 including the step of adjusting the potential difference across said at least one deflection electrode to thereby effect a change in the distortion of the electric field intermediate the deflection electrodes.

14. A method of controlling pattern inclination in an ink jet printer in accordance with claim 10 including the step of applying a potential difference across both of said deflection electrodes to effect a change in potential between said electrodes.

* * * * *